United States Patent [19]

Ueta et al.

[11] Patent Number: 5,205,566
[45] Date of Patent: Apr. 27, 1993

[54] METALLIC GASKET

[75] Inventors: Kosaku Ueta, Kumagaya; Masahiko Nakada, Toyota; Yukio Kawai, Toyota; Takeshi Kitamura, Toyota; Kazuya Yoshijima, Toyota, all of Japan

[73] Assignee: Nihon Metal Gasket Kabushiki Kaisha, Saitama, Japan

[21] Appl. No.: 790,891

[22] Filed: Nov. 12, 1991

Related U.S. Application Data

[63] Continuation-in-part of Ser. No. 594,571, Oct. 9, 1990, abandoned, which is a continuation of Ser. No. 337,974, Apr. 14, 1989, abandoned.

[51] Int. Cl.$^5$ .............................................. F16J 15/06
[52] U.S. Cl. .................................. 277/180; 277/235 B
[58] Field of Search .............. 277/180, 216, 231, 232, 277/234, 235 B, 236

[56] References Cited

U.S. PATENT DOCUMENTS

| | | | |
|---|---|---|---|
| 2,197,916 | 4/1940 | Balfe | 277/235 B X |
| 3,668,036 | 6/1972 | Farnam | 277/235 B X |
| 4,290,616 | 9/1981 | Nicholson | 277/235 B |
| 4,428,593 | 1/1984 | Pearlstein | 277/235 B |
| 4,728,110 | 3/1988 | Nakasone | 277/235 B X |
| 4,810,591 | 3/1989 | Sakai | 277/235 B |
| 4,836,562 | 6/1989 | Yoshino | 277/235 B |
| 4,898,396 | 2/1990 | Udagawa | 277/235 B |

FOREIGN PATENT DOCUMENTS

| | | | |
|---|---|---|---|
| 103662 | 7/1986 | Japan | 277/235 B |
| 155375 | 7/1987 | Japan | 277/236 |
| 181756 | 11/1987 | Japan | 277/235 B |
| 261761 | 11/1987 | Japan | . |
| 186950 | 8/1988 | Japan | 277/235 B |
| 210464 | 9/1988 | Japan | 277/235 B |
| 246572 | 10/1988 | Japan | 277/235 B |
| 293363 | 11/1988 | Japan | 277/235 B |
| 79471 | 3/1989 | Japan | 277/235 B |
| 104953 | 4/1989 | Japan | 277/235 B |
| 285645 | 11/1989 | Japan | 277/235 B |

Primary Examiner—William A. Cuchlinski, Jr.
Assistant Examiner—Scott W. Cummings
Attorney, Agent, or Firm—Varndell Legal Group

[57] ABSTRACT

A main metallic gasket body is formed by interposing an intermediate plate between two elastic metallic plates, each of which have a bead formed around combustion chambers. The intermediate plate is divided into two pieces, steps are formed by the two pieces, and spaced formed between the pieces are provided with thermal spray stoppers.

5 Claims, 1 Drawing Sheet

METALLIC GASKET

CROSS-REFERENCE TO RELATED APPLICATIONS

This application is a continuation-in-part of copending U.S. patent application Ser. No. 07/594,571, filed Oct. 9, 1990 now abandoned, and is a continuation of U.S. patent application Ser. No. 337,974, filed Apr. 14, 1989, now abandoned.

BACKGROUND OF THE INVENTION

The present invention relates to a metallic gasket and, more particularly, to a metallic gasket for use at the junction between a cylinder head and a cylinder block of an internal combustion engine. The present invention is directed to providing a metallic gasket which prevents leakage of combustion gas, cooling water and lubricating oil or the like.

There are a variety of shapes for such metallic gaskets used at the junction between a cylinder head and a cylinder block of an internal combustion engine.

The principle structure is arranged in such a manner that a bead is provided for a base plate made of an elastic metallic plate. The bead is elastically deformed by tightening a bolt, and the elastic restoring force caused by elastically deformed bead provides the sealing effect required at the junction.

A metallic gasket such as that described above can be laminated gasket comprising a plurality of gasket sheets. For example, as disclosed in Japanese Publication No. 62-261761 submitted by the applicant of the present invention, a gasket can have a structure comprising a laminated body formed by disposing two subplates on two sides of a core provided with a bead, together with a stopper provided in the flat portion adjacent to a projection closer to the combustion chamber than the position at which the bead is provided.

However, the above-described type of gasket can break due to the difference in the coefficients of thermal expansion of the stopper which is formed by a thermal spray and the base plate on which the stopper is formed. This is because the stopper is installed at the edge of the combustion chamber, and the base plate and the subplate repeatedly move relative to one another.

SUMMARY OF THE INVENTION

To this end, an object of the present invention is to provide a metallic gasket whose bead is protected from damage and which exhibits an improved sealing effect.

DETAILED DESCRIPTION OF THE INVENTION

Figure 1:
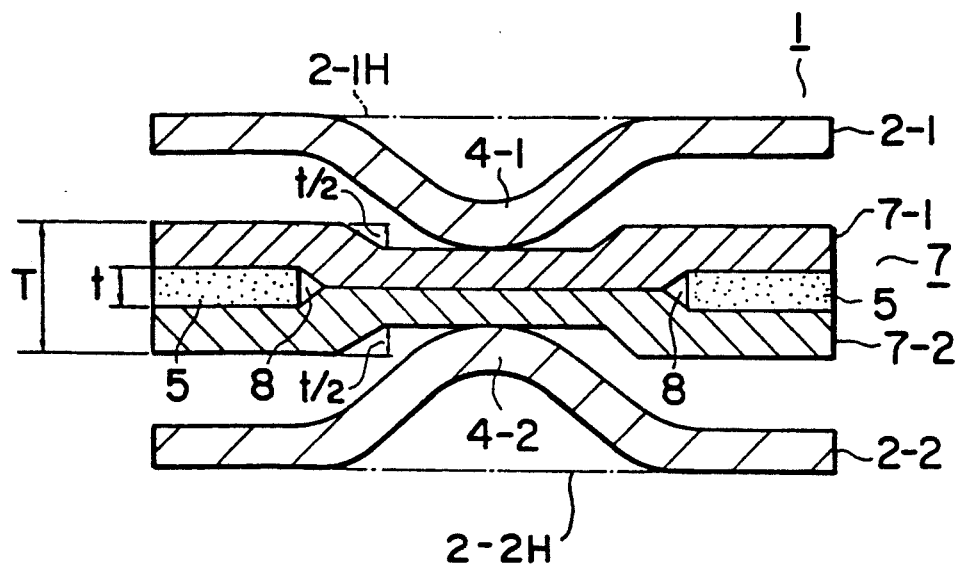
FIG. 1 is a cross-sectional view which illustrates the structure of an embodiment of a metallic gasket according to the present invention.

FIG. 1 is a cross-sectional view which illustrates the structure of an embodiment of a metallic gasket according to the present invention.

Figure 2:
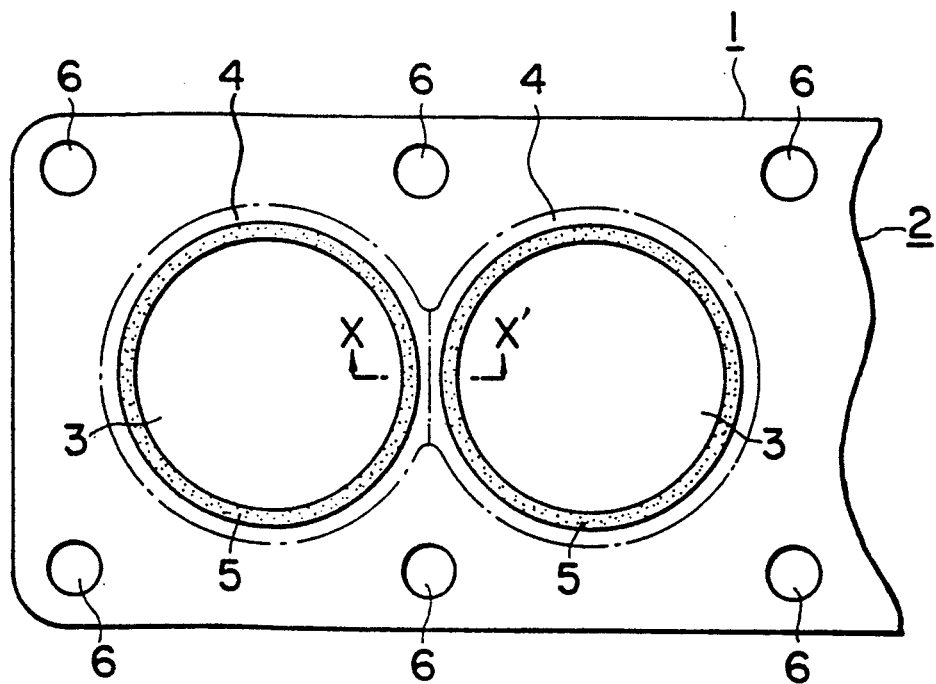
FIG. 2 is a top view of the metallic gasket with portions broken away.

FIG. 2 is a top view of the metallic gasket with a portion broken away. The cross-sectional view taken along line X—X' of FIG. 2 is illustrated in FIG. 1.

Referring to FIG. 2, the structure in the top view of the metallic gasket according to the present invention will now be described. Reference numeral 1 represents a main metallic gasket body formed by a plurality of elastic metallic plates 2 (i.e., 2-1, 2-2), (hereinafter referred to as "base plates"). The metallic plates form a laminated structure, which will be described below.

Reference numeral 3 represents the bore of each combustion chamber, the number of bores corresponding to the number of the combustion chambers in a cylinder block of an internal combustion engine (not shown). A bead 4 is formed around each bore 3 of each combustion chamber.

The space between the bores of the combustion chambers is preferably reduced for the purpose of reducing the size and weight of the engine. A single bead 4 is therefor commonly used for two bores 3 of the two combustion chamber.

A stopper (dotted area) 5 is provided between the bore 3 of the combustion chamber and the bead 4, so that the amplitude of the vibration of the elastic metallic plate 2 is reduced and for protecting the beads from failure due to fatigue.

A plurality of bolt holes 6 are provided in the peripheral portion of the main metallic gasket body 1 so that the metallic gasket can be placed at the junction between the cylinder head (not shown) and the cylinder block (not shown) and then tightened in place with the bolts inserted through the bolt holes 6.

The structure of the present invention with respect to the cross-section view in FIG. 1 will now be described.

In FIG. 1, reference numeral 2-1 represents a first base plate, and 2-2 represents a second base plate. The overall structure of the main metallic gasket body 1 is such that an intermediate plate 7 is held between the first base plate 2-1 and the second base plate 2-2 by respective beads contained therein. A first bead 4-1 is provided in the first base plate 2-1 and a second bead 4-2 is provided in the second base plate 2-1. The beads extend inward toward each other and abut against intermediate plate 7.

A flat surface represented by line 2-1H connecting the upper portions of the first base plate 2-1 is arranged to be positioned in contact with the cylinder head (not shown), while a flat surface represented by line 2-2H connecting the lower portions of the second base plate 2-2 is arranged to be position in contact with the cylinder block (not shown).

The intermediate plate 7 is divided into two pieces 7-1 and 7-2 in the laminating direction thereof, and the portions of these two pieces near the combustion chambers and on both sides of the beads 4-1 and 4-2 include step portions t/2.

The level t/2 of the step is illustrated only for reference. It can be arbitrarily defined in the basis of a selected combination of the thickness of the base plate and the shape of the bead.

As a result, a space 8 of a width t is created when the two pieces 7-1 and 7-2 of the intermediate plate 7 are joined. Reference numeral 5 represents a stopper formed by a thermal spraying and positioned within the thus-formed space 8.

An additional sealing effect can be obtained by applying a sealing agent between the inner surface of the space 8 defined by the stepped portion and the stopper 5.

The operation will next be described.

When the thus-formed main metallic gasket body 1 is secured, with bolts between the cylinder head (not shown) and the cylinder block (not shown), the height of the metallic gasket in the form of the laminate is reduced due to the deformation caused by the compression which results from the tightening of the bolts.

However, the degree of reduction in height attainable is attainable is restricted by thickness T of the step. The enables the step portions to serve as stoppers, and protects the stoppers 5 against damage, since they are held between the divided intermediate plates 7-1 and 7-2.

Furthermore, since the stopper 5 are formed by a thermal spraying, their thickness can be varied arbitrarily.

As described above and according to the present invention, the intermediate plate held by the base plates is divided into two pieces each of the two pieces has a step formed at its end portion adjacent to a bore of a combustion chambers. Further, the spaces created by the steps when the two pieces are joined together are arranged to be at positions where the stoppers are formed by thermal spraying. As a result, a metallic gasket can be protected against damage, the thickness of the stoppers can be arbitrarily varied at the time of adjusting the gap between the cylinder head and the cylinder block, and the metallic gasket exhibits an improved sealing due to the position of the stopper.

We claim:

1. A metallic gasket having bores therein corresponding to combustion chambers and comprising a pair of spaced elastic metallic base plates, said base plates having inwardly extending projections defining beads around said bores, an intermediate plate disposed between said base plates and including two pieces laminated together at said beads, said pieces having edge surfaces disposed adjacent said bores and including outwardly extending steps between said beads and said edge surfaces to define spaces formed between said pieces and opening at said edge surfaces, and a thermal spray stopper disposed within each of said spaces.

2. A metallic gasket as defined in claim 1 wherein said beads on said base plates hold said intermediate plate in position.

3. A metallic gasket as defined in claim 1 wherein the thickness of said spaces between the two pieces is t and the thickness of said steps of each of said pieces is t/2.

4. A metallic gasket according to claim 1, wherein said spaces have a height t and said steps have a height of t/2.

5. A metallic gasket having bores therein corresponding to combustion chambers and comprising a pair of spaced elastic metallic base plates, said base plates having inwardly extending projections defining beads around said bores, an intermediate plate disposed between said base plates and including two pieces laminated together at said beads, said pieces having edge surfaces disposed adjacent said bores and including outwardly extending steps between said beads and said edge surfaces to define spaces formed between said pieces and opening at said edge surfaces, a thermal spray stopper disposed within each of said spaces and occupying outer portions of said spaces, and a sealing agent provided inwardly of said stoppers between inner walls of said pieces at said steps.

* * * * *